United States Patent [19]

Hoshi

[11] Patent Number: 4,616,678
[45] Date of Patent: Oct. 14, 1986

[54] MEANS FOR PREVENTING WATER HAMMER IN FLUID-FEEDING SYSTEM

[75] Inventor: Mitsuo Hoshi, Tokyo, Japan

[73] Assignee: Hokuto MFG, Co., Ltd., Tokyo, Japan

[21] Appl. No.: 771,026

[22] Filed: Aug. 30, 1985

[30] Foreign Application Priority Data

Jun. 6, 1985 [JP] Japan .................... 60-123107

[51] Int. Cl.⁴ .................................. F16K 19/00
[52] U.S. Cl. ........................ 137/888; 138/41; 138/42
[58] Field of Search ............... 137/888; 138/41, 42

[56] References Cited

U.S. PATENT DOCUMENTS

| | | | |
|---|---|---|---|
| 2,238,146 | 4/1941 | Yavitch | 138/42 X |
| 2,254,587 | 9/1941 | Williams | 138/42 X |
| 2,949,934 | 8/1960 | Schrenk | 138/42 X |
| 3,865,352 | 2/1975 | Nelson | 138/42 X |

*Primary Examiner*—Robert G. Nilson
*Attorney, Agent, or Firm*—Murray & Whisenhunt

[57] ABSTRACT

Means for preventing water hammer in a fluid-feeding system caused by a jet mixer installed in the fluid-feeding system. The jet mixer comprises a casing having an inlet and an outlet for the system fluid and a supply port for a material to be mixed into the system fluid, and a venturi-type jet tube within the casing. A group of a plurality of spring-shaped elements is padded within a chamber defined between the jet tube and the surrounding casing.

2 Claims, 2 Drawing Figures

MEANS FOR PREVENTING WATER HAMMER IN FLUID-FEEDING SYSTEM

BACKGROUND OF THE INVENTION

The present invention relates to an improved means for preventing water hammer in a fluid-feeding system utilizing a jet mixer therein.

It is well known to utilize a jet mixer to add or mix a gaseous or aqueous material into a fluid-feeding system flowing with a predetermined flow rate to process the inflow fluid, for example, as an inline steam heater for heating and hot water service, means for liquid temperature control or automatic heating fluid temperature control, or for chemical processing as disclosed in British Patent Specification No. 1,156,820, etc.

In general, a jet mixer comprises, as shown in FIG. 1, a casing 1 having an inlet 2 and an outlet 3 for a fluid-feeding system, a supply port 4 for a gaseous or aqueous material to be mixed into the fluid-feeding system, and a venturi-type jet tube 5 interposed between and fixed to the inlet 2 and the outlet 3, having at its periphery a plurality of jets 7 which are oriented at an acute angle to the direction of flow of the fluid-feeding system. The jet tube 5 has a through passage 6 (see FIG. 2) so configured to have a decreasing cross-sectional area, progressively, from the inlet 2 toward an intermediate portion and then increasing, progressively, toward the outlet 3. The connection of the jet tube 5 to the casing 1 is effected by means of, for example, thread-engagement 8 at one end thereof and fit-engagement through a packing 9 at the other end. A drain plug 11 is also provided.

With the jet mixer having aforementioned arrangement installed in the fluid-feeding system, the gaseous or aqueous material (fluid) which is intended to be mixed into the fluid-feeding system is introduced through the supply port 4 into the chamber defined between the jet tube 5 and the inner wall of the casing 1, and then is sucked through the plurality of jets 7 and mixed with the fluid passing through the venturi-shaped passage 6.

On this occasion, a water hammer is liable to occur in the fluid-feeding system due to abrupt changes in the flow rate and the density of the fluid in the system, caused by passage of the mixing fluid through the small jets 7, resulting in vibration or noise.

In order to avoid the above phenomenon, a proposal has been made in the prior art, as disclosed in Japanese Utility Model Publication No. 31468/1977, in which a cross-woven or knitted screen consisting of fibrous metal filaments made of, for example, stainless steel is padded in the chamber defined by the jet tube and the inner wall of the casing of the jet mixer (see reference numeral 10 in FIG. 2).

With aforementioned arrangement, the drawbacks such as noise and vibration in the fluid-feeding system caused by such water hammer have been substantially remedied, due to a decelerating effect of the screen against the inflowing mixing fluid. However, in practice, some further problems are left.

That is, the fibrous metal filaments of the cross woven or knitted screen used in the above example are (1) apt to be deteriorated in their ability as a screen due to accumulation of rust, dirt and the like therebetween, and (2) liable to break into small pieces within the casing and flow into the fluid-feeding system, causing the components of the system to be damaged, or clogging the screen and so on, and in particular, in the case of an edible fluid, those small pieces may have fatal affects.

OBJECTS AND ADVANTAGES OF THE INVENTION

Accordingly, it is an object of the present invention to provide a novel means for preventing such a water hammer caused by the use of a jet mixer in a fluid-feeding system, and to prevent such a water hammer without degrading the shock-absorbing and decelerating capabilities thereof for the mixing-material in a padding, so as to render it particularly suitable for preventing a water hammer. Thus, a more silent mixing operation may be carried out without noise or vibration caused by a water hammer than those used in the prior art.

BRIEF DESCRIPTION OF THE DRAWINGS

With reference to the accompanying drawings.

DETAILED DESCRIPTION OF THE INVENTION

Figure 1:
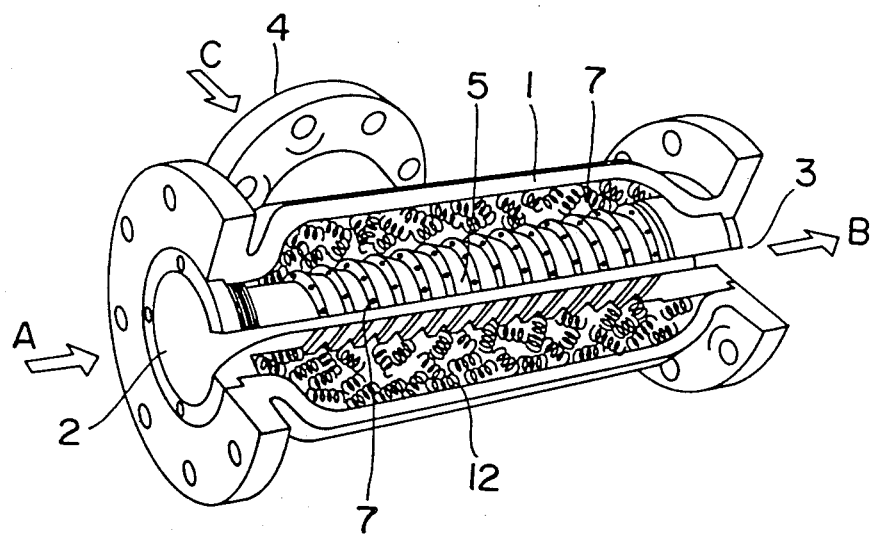
FIG. 1 is a longitudinal sectional view of the jet mixer known in the prior art, but containing the present padding.
Figure 2:
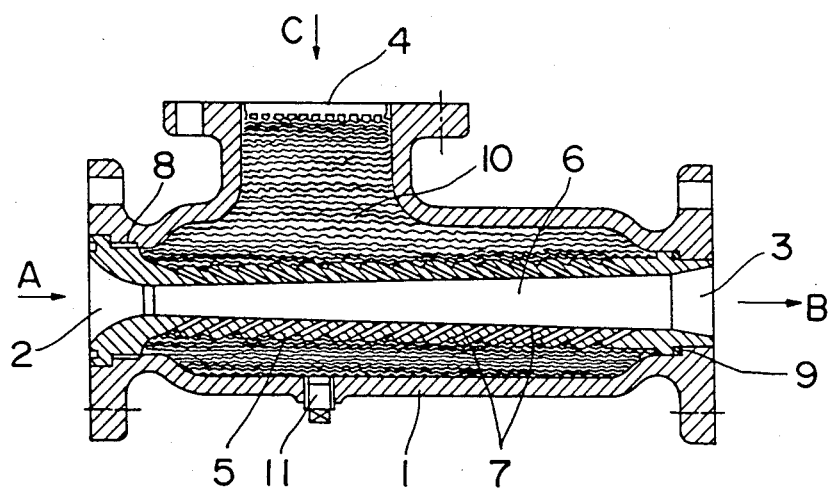
FIG. 2 shows a partially cutaway view in perspective of a preferred embodiment of the jet mixer according to the present invention, but containing a screen padding of the prior art.

Turning now descriptively to FIG. 1 in which similar reference numbers denote similar elements such as the casing, the jet tube and the like as in FIG. 2, a group of spring-shaped elements 12 adapted to use as the screen padding is accommodated within the casing 1 of the jet mixer, and is made of any material suitable to the properties of material to be mixed. As shown in FIG. 1, the diameter of each spring element 12 is large compared to the diameter of jets 7 and is also larger than that of the fibrous metal filament used as the screen in the jet mixer in the prior art as shown in FIG. 2. These spring-shaped elements 12, each having a predetermined configuration may be obtained by cutting continuous, long spring-shaped materials to a desired size, which will, of course, depend on the size of the jet mixer. These spring-shaped elements 12 are filled uniformly within a chamber defined between the jet tube and the inner periphery of the casing.

The size and material of each spring-shaped element 12 may be so selected as they are adapted to the properties of the mixing-fluid passing through and among them, for example, an acid and wear resisting material for the acid fluid, or, in particular, heat resistant materials for the high temperature steam in heat exchangers, for example, may be used.

In operation, the gaseous or aqueous mixing-material is introduced or sucked into the mixing-material chamber filled with the group of spring-shaped elements 12 prepared in accordance with the present invention and through the supply port 4. Then the flowing velocity of the mixing-material will be progressively decreased during its flow between the plurality of spring-shaped elements 12, while it runs against and into the group of the spring-shaped elements filled uniformly within the chamber, thus being deflected, turned and twisted. Then, the mixing material will be led to the jets 7 of the jet tube 5, and finally mixed into the fluid-feeding system.

What is claimed is:

1. In an apparatus for preventing water hammer in a fluid-feeding system having a jet mixer therein, said jet mixer comprising a surrounding casing having an inlet and an outlet for fluid flowing in said system and a supply port for supplying a gaseous or fluid material to be mixed into said system, and a venturi-type jet tube interposed between and fixed to said inlet and said outlet and having a plurality of jets at the periphery thereof, the improvement comprising a group of a plurality of discreet spring-shaped elements made of materials which are compatable to the properties of said material to be mixed, said elements being uniformly disposed within a chamber defined between said jet tube and the surrounding casing.

2. The apparatus of claim 1 wherein the materials of the said elements are selected from acid resistant, wear resistant and high temperature resistant materials.

* * * * *